(12) United States Patent
Ho et al.

(10) Patent No.: US 6,386,979 B1
(45) Date of Patent: *May 14, 2002

(54) METHODS AND SYSTEMS FOR TRANSFERRING GAME SAVES BETWEEN A GAME SYSTEM MEMORY CARD AND A COMPUTER

(75) Inventors: Patrick Ho; Jack Tam; Steven Tsui, all of Special Administration Region (HK)

(73) Assignee: STD Manufacturing Ltd., Kwai Chung (HK)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,571

(22) Filed: Nov. 4, 1998

(51) Int. Cl.[7] ................................................ A63F 11/00
(52) U.S. Cl. ...................................................... 463/43
(58) Field of Search ............................. 463/74, 43, 44, 463/45, 46, 47, 31, 33; 710/72, 74; 235/381, 383, 385, 486

(56) References Cited

U.S. PATENT DOCUMENTS

| | | | |
|---|---|---|---|
| 4,858,930 A | | 8/1989 | Sato ........................... 273/85 G |
| 5,179,517 A | | 1/1993 | Sarbin et al. ............... 364/410 |
| 5,259,626 A | | 11/1993 | Ho .............................. 273/438 |
| 5,273,294 A | | 12/1993 | Amanai ...................... 273/435 |
| 5,362,068 A | | 11/1994 | Liu ............................. 273/435 |
| 5,584,043 A | * | 12/1996 | Burkart ....................... 710/62 |
| 5,584,044 A | * | 12/1996 | Gouhara et al. ............ 710/74 |
| 5,624,316 A | * | 4/1997 | Roskowski et al. .......... 463/45 |
| RE35,520 E | | 5/1997 | Darling et al. ................ 463/45 |
| 5,666,495 A | * | 9/1997 | Yeh ............................. 710/101 |
| 5,689,732 A | * | 11/1997 | Kondo ........................ 710/64 |
| 5,724,074 A | * | 3/1998 | Chainani et al. ............ 345/474 |
| 5,759,100 A | * | 6/1998 | Nakanishi ..................... 463/37 |
| 5,785,598 A | * | 7/1998 | Hsu ............................. 463/44 |
| 5,793,999 A | * | 8/1998 | Mori ........................... 710/129 |
| 5,809,520 A | | 9/1998 | Edwards et al. ............ 711/115 |
| 5,818,029 A | * | 10/1998 | Thomson ..................... 235/486 |
| 5,828,862 A | * | 10/1998 | Singkornrat et al. .......... 463/44 |
| 5,848,298 A | * | 12/1998 | Steere, Jr. et al. ............ 710/62 |
| 5,897,437 A | * | 4/1999 | Nishiumi et al. ............. 463/47 |

FOREIGN PATENT DOCUMENTS

| | | |
|---|---|---|
| EP | 0 431 723 | 6/1991 |
| EP | 0 681 297 | 11/1995 |

OTHER PUBLICATIONS

Object–Oriented File Transfer, IBM Technical Disclosure Bulletin NN950747.*

"Save, Send, And Archive With The DexDrive—For N64 & PlayStation By InterAct", Jun. 19, 1998.

"Sony Computer Entertainment America Expands The World Of Its PlayStation Game Console Through Introduction Of Personal Digital Assistant (PDA)", Aug. 30, 1999, pp. 1–2.

"The DexDrive" Nov. 18, 1998.

* cited by examiner

*Primary Examiner*—John Paradiso
(74) *Attorney, Agent, or Firm*—Leydig, Voit, & Mayer, Ltd.

(57) ABSTRACT

The present invention includes methods and systems for transferring game saves between a game system memory card and a personal computer. According to one aspect, the present invention may include a game save transfer device that connects to game system memory cards, reads game saves from the game system memory cards, and writes game saves to the memory cards. The game save transfer device may also connect to the computer to read game saves from and write game saves to the computer. According to another aspect, the present invention may include a control program for controlling transfer of game saves between a game system memory card and a computer in response to input from a user.

1 Claim, 8 Drawing Sheets

METHODS AND SYSTEMS FOR TRANSFERRING GAME SAVES BETWEEN A GAME SYSTEM MEMORY CARD AND A COMPUTER

TECHNICAL FIELD

The present invention relates to methods and systems for transferring game saves between a game system memory card and a computer. More particularly, the present invention relates to methods and systems for transferring game saves from a game system memory card to a personal computer, storing game saves in memory associated with a personal computer, and transferring game saves from a personal computer to a game system memory card.

BACKGROUND OF THE INVENTION

In electronic game systems, such as the "Nintendo 64" game system available from Nintendo Company or the "PlayStation" game system available from Sony Corporation, some games allow a user to save information relating to a particular state of a game on a game system memory card. This information is commonly referred to as a game save. Game saves allow users to recreate the state of a game program at the point where a previous instance or execution terminated. For example, an electronic football game program, such as "John Madden Football" for the Sony "PlayStation" may allow a user to play a simulated football season and save statistical information regarding the user's team at a given point in the season. During one execution of the game program, the user may play the first three football games of a simulated season and save statistical information for the user's team at that point in the simulated season. If the user's team wins the first three games, the team win/loss record of three wins and zero losses may be stored on the game system memory card along with additional operating information, so that the game program, stored on a separate cartridge or disk, can restart at the point where the previous execution of the game program terminated. Thus, when the user restarts the game program, the user inserts the game system memory card with the game save into the game system console. The game cartridge or disk must also be inserted in the game system console, since game saves generally do not contain all of the information needed to execute a game program. The game system console reads the game save on the game system memory card and the game cartridge or disk and starts the game program at the point where the user finished in the previous instance. Thus, in sports games, storing game saves on game system memory cards prevents the user from having to restart the entire season each time the user plays the game. Game saves may be used in a similar manner in adventure games and other games to allow restarting at a previous state of a game program.

Although storing game saves on game system memory cards has a number of advantages, the storage capability of a single game system memory card is limited. For example, in one game system memory card configured to store game saves for the "PlayStation" game system, the memory card is limited to fifteen blocks of game storage space. A game save requires at least one block of memory. Some game saves require multiple blocks of memory. Thus, a fifteen-block game system memory card may store, at most, fifteen game saves.

Similarly, in game system memory cards configured to store game save s for the "Nintendo 64" game system, memory space is divided into pages. A memory card has a finite number of pages. Game saves may require one or more pages. Thus, the number of game saves that can be stored on a game system memory card configured to store game saves for the "Nintendo 64" game system is also limited. Because the user may desire to store multiple game saves for a single game or for multiple games, the user may be required to purchase multiple game system memory cards or game system memory cards with increased storage capacity.

Storing game saves exclusively on game system memory cards may limit a user in sharing game saves with another user to physically transferring the game system memory card including the game saves to another user. For example, a first user who achieves a high level in an adventure game may save the information required to replay the game at the same level as a game save on a game system memory card. In order for the first user to transfer the game save to a second user so the second user can start at the high level, the first user physically transfers the game system memory card to the second user. The second user inserts the game system memory card in his or her game system console in order to start the game at the high level.

While the second user is using the first user's game system memory card, the first user is prevented from accessing the game save or from storing further game saves on the game system memory card. In addition, the first user may lose his or her game save because the second user may erase or write over game saves on the game system memory card.

Some game system consoles, such as the Sony "PlayStation" game console, have two memory card slots to allow copying of game saves from one game system memory card to another game system memory card. However, even with this mechanism, game saves cannot be shared without physical transfer of a game system memory card. For example, a first user may have two game system memory cards. In order to transfer game saves to a second user, the first user may copy game saves from one game system memory card to the other using the game system console and lend the game system memory card with the copy to the second user. In another scenario, two users may each have a single game system memory card. In order to transfer game saves, the second user may lend his or her game system memory card to the first user, the first user may copy game saves from his or her game system memory card to the second user's game system memory card. The first user may then return the second user's game system memory card. In either scenario, physical transfer of a game system memory card is required to share game saves. Because of the limited storage capacity of game system memory cards and the inability to communicate game saves to other users without physically transferring game system memory cards, there exists a need for an alternate mechanism for transferring and storing game saves.

SUMMARY OF THE INVENTION

It is an object of the invention to provide a system for transferring game saves from a game system memory card to a personal computer and from a personal computer to a game system memory card.

As used herein, the term "game system memory card" refers to a single-connector device that connects to a memory card socket in a game system console. Exemplary memory cards of this type include the "CONTROLLER PAK" available from Nintendo Company and the "Memory Card" available from InterAct Accessories, Inc.

According to one aspect of the invention, a game save transfer device includes a first interface for communicating with a game system memory card. A second interface communicates with a computer. A processing circuit is coupled to the first and second interfaces and transferring game saves from the game system memory card to the computer.

According to another aspect of the invention, a computer-readable medium includes computer-executable instructions for performing steps. The steps include reading game saves stored on a game system memory card and displaying game save information to a user. In response to a first input from the user, the game saves are transferred from the game system memory card to a computer.

According to another aspect, the present invention includes a system for transferring game saves between a game system memory card and computer. In the system, a game save transfer device transfers game save information from a game system memory card to a computer. A control unit controls the game save transfer device, in response to user input, to transfer game saves from the game system memory card to the computer.

According to another aspect, the present invention includes a system for transferring game saves from a game system memory card to a computer. In the system, a connection device connects a game system memory card to a computer. A computer readable medium includes computer executable instructions for reading game saves stored on the game system memory card and displaying game save information to a user. The computer executable instructions also include accepting a request from the user to read a game save from the memory card. The request from the user is converted into address signals. The address signals are transmitted to the game system memory card through the connection device. A game save transmitted from the game system memory card is received through the connection device. The game save is stored in memory associated with the computer.

According to another aspect, the present invention includes a graphical user interface displayable on an electronic display device for controlling transfer of game saves between a computer and a game system memory card. A first display area displays game save information corresponding to game saves stored on a game system memory card. A second display area displays game save information corresponding to game saves stored in memory associated with a computer. A copying unit copies game save information from the second display area to the first display area and transfers corresponding game saves from the game system memory card to the memory associated with the computer.

According to another aspect, a method for transferring game saves between game system memory cards and computers includes displaying game save information regarding game saves stored on a game system memory card to a user. The game saves are read from the game system memory card in response to requests from the user. The game saves are transferred to a first computer connected to the game system memory card.

DETAILED DESCRIPTION OF THE INVENTION

Figure 1:
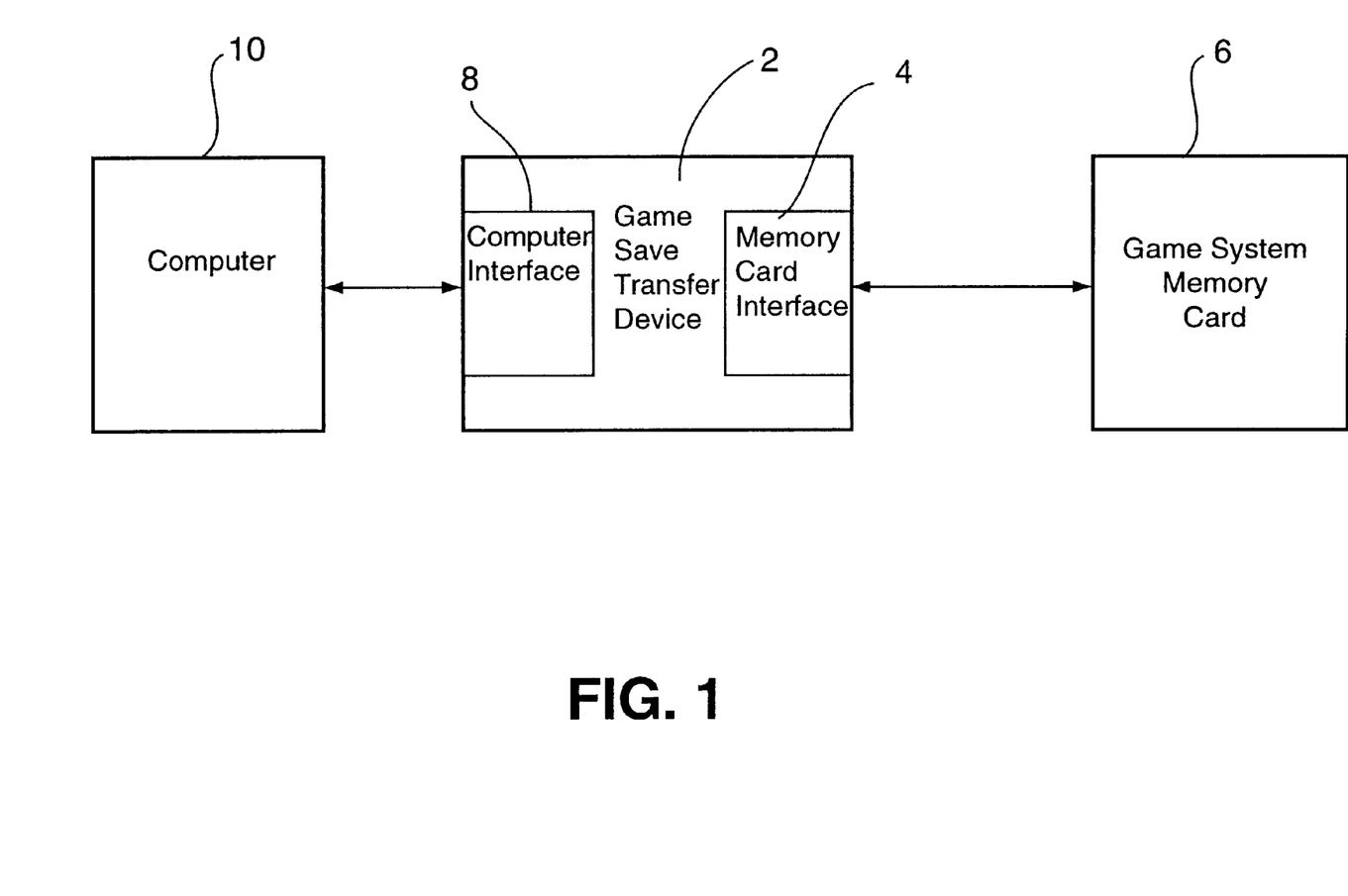
FIG. 1 is a block diagram of a system for transferring game saves between a personal computer and a game system memory card according to an embodiment of the present invention.

FIG. 1 illustrates a system for transferring game saves between a personal computer and a game system memory card according to an embodiment of the present invention. The system may include a game save transfer device 2. The game save transfer device 2 includes a memory card interface 4 for communicating with a game system memory card 6 and a computer interface 8 for communicating with a computer 10, such as a personal computer. The game save transfer device 2 may include a processing circuit (not shown) for reading game save information stored on the game system memory card 6, writing game save information read from the game system memory card 6 to the computer 10, receiving game save information read from the computer 10, and writing the game save information received from the computer 10 to the game system memory card 6.

The game save transfer device may be located internally or externally to the computer 10. For example, the game save transfer device may comprise an adapter card connectable to an internal computer bus, such as a PCI bus. In a preferred embodiment, the game save transfer device is located externally to the computer and connects to the computer through a cable.

Figure 2:
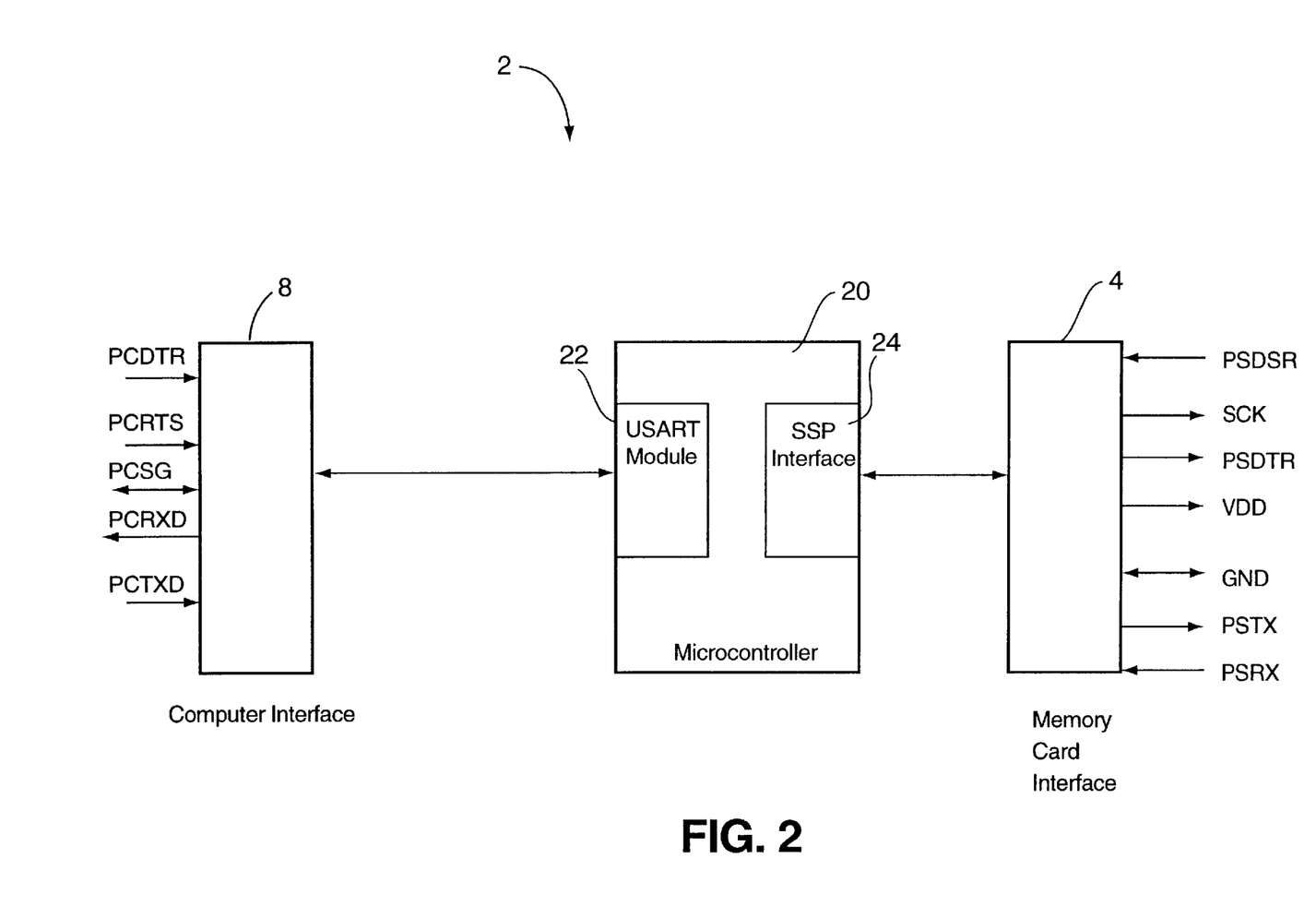
FIG. 2 is a block diagram of a game save transfer device according to the embodiment of FIG. 1.

FIG. 2 is a more detailed block diagram of the game save transfer device 2 according to the embodiment of FIG. 1. In FIG. 2, the game save transfer device 2 includes a microcontroller 20. In a preferred embodiment, the microcontroller 20 comprises a PIC16C65A available from Microchip Technology, Inc. The present invention is not limited to using the PIC16C65A microcontroller. Any microcontroller suitable for communicating with a computer and reading data is within the scope of the invention.

In the illustrated embodiment, the computer interface 8 is an RS-232 interface configured to communicate with a personal computer through the serial port of the personal computer. In an alternative embodiment, the computer interface 8 may be configured to communicate with the parallel port of the personal computer. In yet another alternative, the computer interface 8 may be configured to communicate with an ISA interface, a PCI interface, or a PCMCIA interface of the computer 10. The computer interface 8 may utilize standard RS-232 signal lines to transfer game saves to and from the computer. In the illustrated embodiment, the signal lines PCDTR and PCRTS provide power to the microcontroller 20. The signal line PCSG provides a ground connection for the microcontroller 20. The signal line PCTXD may be used to receive data, such as game saves, transmitted from the computer. The signal line PCRXD may be used to transmit data, such as game saves, from the microcontroller 20 to the computer. In operation, each of the signal lines PCDTR, PCRTS, PCSG, PCRXD, and PCTXD may be coupled to a pin of the computer's serial port that receives or provides the corresponding signal. Connection between the signal lines of the computer interface 8 and the computer serial port may be established through any suitable means, e.g., through a cable or an adapter.

In order to transfer game save information between the computer interface 8 and the microcontroller 20, the signal lines PCTXD and PCRXD may be respectively coupled to serial data receive and transmit ports of the microcontroller 20. For example, if the microcontroller comprises a PIC16C65A, the signal lines PCTXD and PCRXD may communicate with the Universal Synchronous Asynchronous Receiver Transmitter (USART) module 22 of the microcontroller 20. In a preferred embodiment, the signal line PCTXD may be coupled to pin RC7 of the USART module 24 to receive game save information transmitted from the computer. The signal line PCRXD may be coupled to pin RC6 of the USART module to transmit game saves to the computer.

The memory card interface 4 may comprise any interface for communicating game saves to and from the game system memory card 6. Since game system memory cards typically communicate serially with external devices, the memory card interface 4 may comprise a serial communications interface. The memory card interface may include a connector having pins or pads for connecting with one or more game system memory cards. For example, the memory card interface may include a connector or connectors for connecting to one or more game system memory cards for the Sony "PlayStation" game system, the "Nintendo 64" game system, or any other game system that utilizes game system memory cards to store game save data.

In the illustrated embodiment, the memory card interface 4 comprises a group of signal lines for serially reading game saves from and writing game saves to a game system memory card configured to the store game save information for the Sony "PlayStation" game system. The memory card interface 4 may utilize standard RS-232 signals to communicate game saves to and from the game system memory card 6. For example, in the illustrated embodiment, the signal line PSDSR indicates whether the memory card 6 is ready for communication. The signal line PSDTR indicates whether the microcontroller 20 is ready to transmit data to the game system memory card 6. The signal lines VDD and GND respectively provide power and ground to the game system memory card 6. The signal line PSTX transmits game saves from the game save transfer device 2 to the game system memory card 6. The signal line PSRX transfers game saves from the game system memory card 6 to the game save transfer device 2.

In order to transfer game saves between the memory card and the microcontroller, if the microcontroller comprises a PIC16C65A, the memory card signal lines mentioned above may communicate with the Synchronous Serial Port (SSP) interface 24 of the microcontroller. In a preferred embodiment, the SSP interface 24 operates in the Serial Peripheral Interface (SPI) mode to serially transfer game saves to and from the game system memory card 6. In particular, the pin RC5 of the SSP Interface 24 may be connected to the signal line PSTX to transmit game save information from the microcontroller 20 to the game system memory card. The pin RC4 of the SSP interface may be connected to the signal line PSRX to receive game saves from the game system memory card.

In communications between the computer and the microcontroller 20, the computer may send commands to the microcontroller 20 to read game saves from and write game saves to the game system memory card. The microcontroller 20 responds to commands received from the computer. Exemplary commands that may be recognized by the microcontroller 20 include hardware recognition, read device status, read memory card, and request write memory card. The hardware recognition command is used by the computer to recognize hardware connected to the computer's serial port. The data structure of this command is not essential to the invention and is not described further. The read device status command allows the computer to determine whether a game system memory card with game saves is connected to the interface 4. The data structure of this command is not essential to the invention and is not described further.

Figure 3:
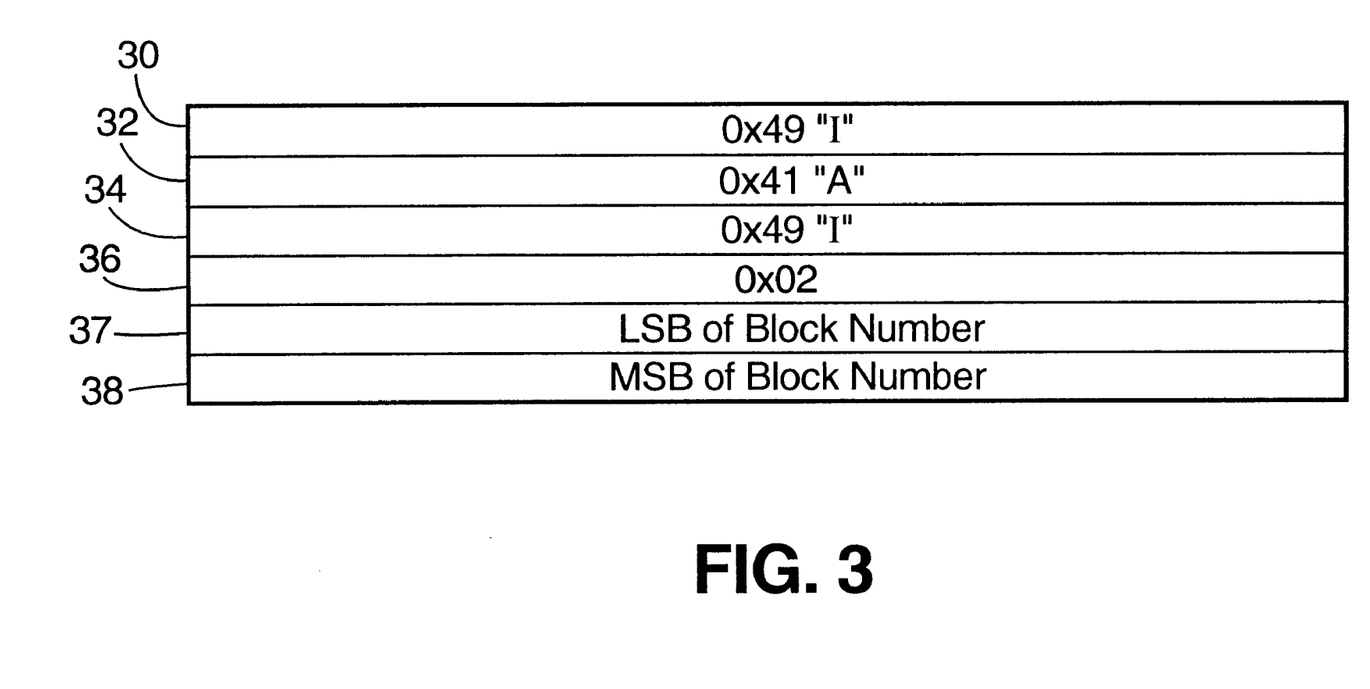
FIG. 3 is a block diagram of the data structure for a read memory card command according to an embodiment of the invention.

The read memory card command is utilized by the computer to read game saves from the game system memory card. For example, a game system memory card configured to store game data for the "PlayStation" is divided into logical memory blocks, e.g., 1024 blocks. Each block may contain 128 bytes of data. Game saves may be located in different blocks in the game system memory card. Thus, in order to read a particular game save, the computer preferably notifies the microcontroller 20 of the block or blocks to be read. This notification may be provided in the read memory card command. FIG. 3 illustrates an exemplary data structure for the read memory card command. Each row in the data structure corresponds to a byte in the read memory card command data structure. The first three rows 30, 32, and 34 contain synchronization characters, for example, "IAI". The fourth row 36 contains the command code that the microcontroller 20 utilizes to identify the read memory card command. In the illustrated embodiment, the command code for the read memory card command is 0x02. The fifth row 37 stores the least significant byte of a block number of a block to be read. The sixth row 38 contains the most significant byte of the block number of the block to be read. For example, if it is desired to read block 3 in a game system memory card containing 1024 blocks, the block numbers of the game system memory card may range from $0_{10}$ to $1023_{10}$ or 0x0000 to 0x03FF. Thus, the block number for block 3 may be specified by 0x0002. In order to read block 3, the fifth row 37 of the read memory card data structure may contain 0x02 and the sixth row 38 of the read memory card data structure may contain 0x00.

In response to the read memory card command, the microcontroller 20 may decode the block number specified in the read memory card command, extract the data corresponding to the block, and transmit the block of data to the computer. In order to decode the block number, the microcontroller 20 may execute a program for determining memory addresses for the game system memory card corresponding to the block number. For example, if each block of game save data in the game system, memory card contains 128 bytes, block 1 of the game system memory card may contain bytes 0–127 of game save data, block 2 may contain bytes 128–255, block 3 may contain bytes 256–383, etc. The starting and ending addresses for block 1 may be 0x0000–0x007F. The starting and ending addresses for block 2 may be 0x0080–0x00FF. The starting and ending addresses for block 3 may be 0x0100–0x017F. Thus, a read memory card command requesting data from block number 3 may be decoded to read game save data stored at addresses 0x0100–0x107F in the game system memory card.

In order to extract the data from the game system memory card, the microcontroller may apply address signals and read signals to the serial interface of the memory card, e.g., through the RS-232 signal lines, as discussed above. The serial interface of the memory card may convert the serial data to parallel data, extract the requested game save, and transmit the game save serially to the microcontroller 20. The microcontroller 20 may read all of the data from the game system memory card when the game system memory card is first connected to the memory card interface 4 and store the data in cache memory inside the game save transfer device. Alternatively, the game saves may be retained in the game system memory card and read from the game system memory card when the computer transmits a read memory card command.

Figure 4:
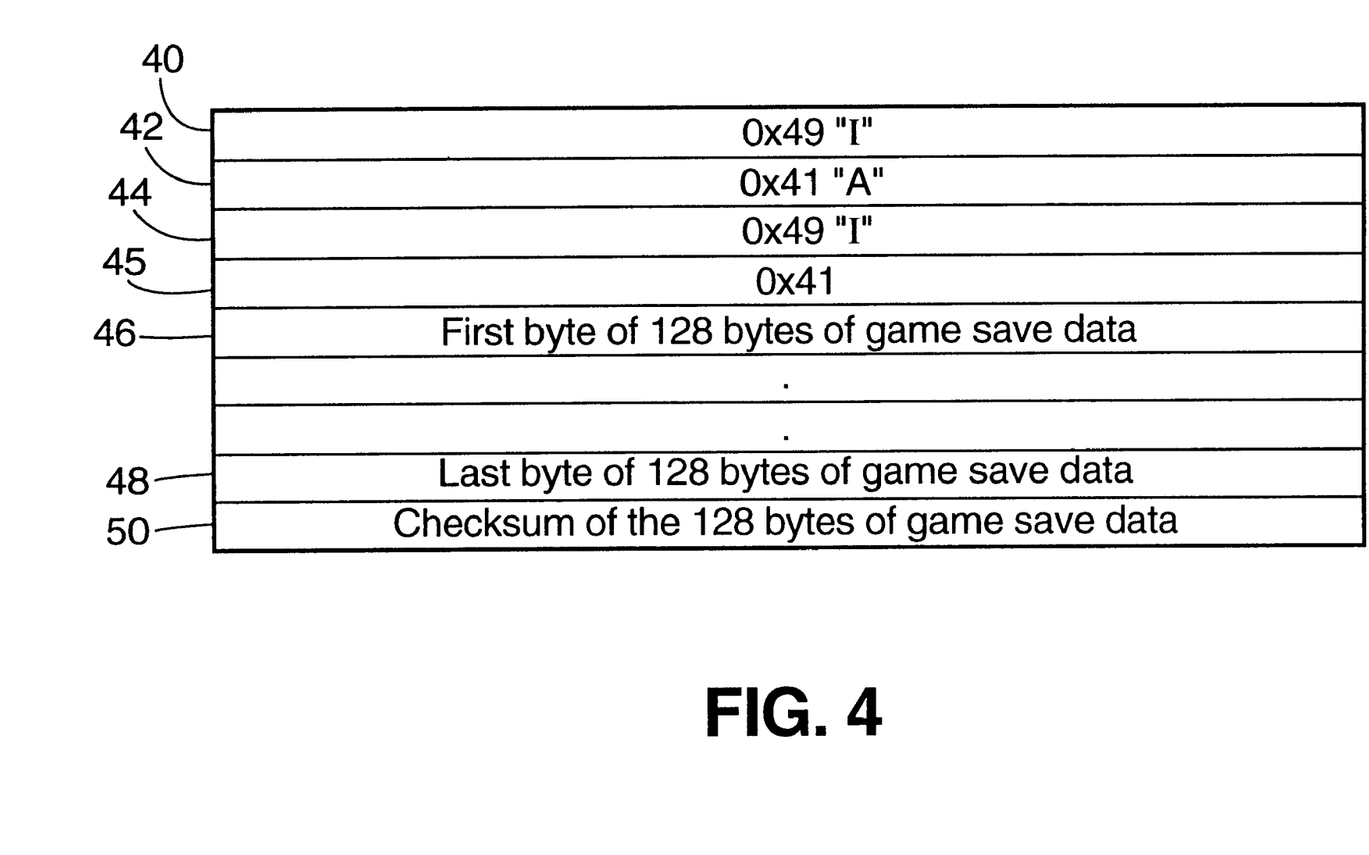
FIG. 4 is a block diagram of a data structure for transmitting one block of game save information from a game save transfer device to a computer according to an embodiment of the invention.

In order to transmit game saves extracted from the game system memory card to the computer, the microcontroller 20 may utilize a data structure to indicate that the response contains a game save. FIG. 4 illustrates an exemplary data structure for sending a game save to the computer extracted from a game system memory card configured to store game saves for the Sony "PlayStation". Each row in the data structure illustrated in FIG. 4 corresponds to one byte of the exemplary data structure. The first three rows, 40, 42, and 44, are used for synchronization between the microcontroller 20 and the computer. The fourth row 45 is a code indicating to the computer that the data structure contains game save data from the memory card. Because game system memory cards configured for the Sony "PlayStation" store game saves in block units of 128 bytes each, the block number specified in the read memory card command extracts 128 bytes of data from the game system memory card. Accordingly, the fifth row 46 in the data structure illustrated in FIG. 4 contains the first byte of the 128 bytes of data extracted from the game system memory card. The second-to-last row 48 contains the last byte of the 128 bytes of data extracted from the game system memory card. Rows between rows 46 and 48 indicate bytes between the first and last bytes of the block. Finally, row 50 indicates a checksum used to detect errors in the received data.

The present invention is not limited to the data structure illustrated in FIG. 4 to transmit game saves to the computer. For example, when transmitting game saves from a game system memory card configured to store game saves for the "Nintendo 64" game system, the data structure may contain 256 bytes of data because game system memory cards configured to store game saves for the "Nintendo 64" game system store game saves in pages of 256 bytes each. In an alternative embodiment, the data structure for transmitting game saves read from game system memory cards for either game system may contain more than one block or more than one page of data. In another alternative, the data structure may contain any amount of data used to store one or more units of game save information on other electronic game systems.

Figure 5:
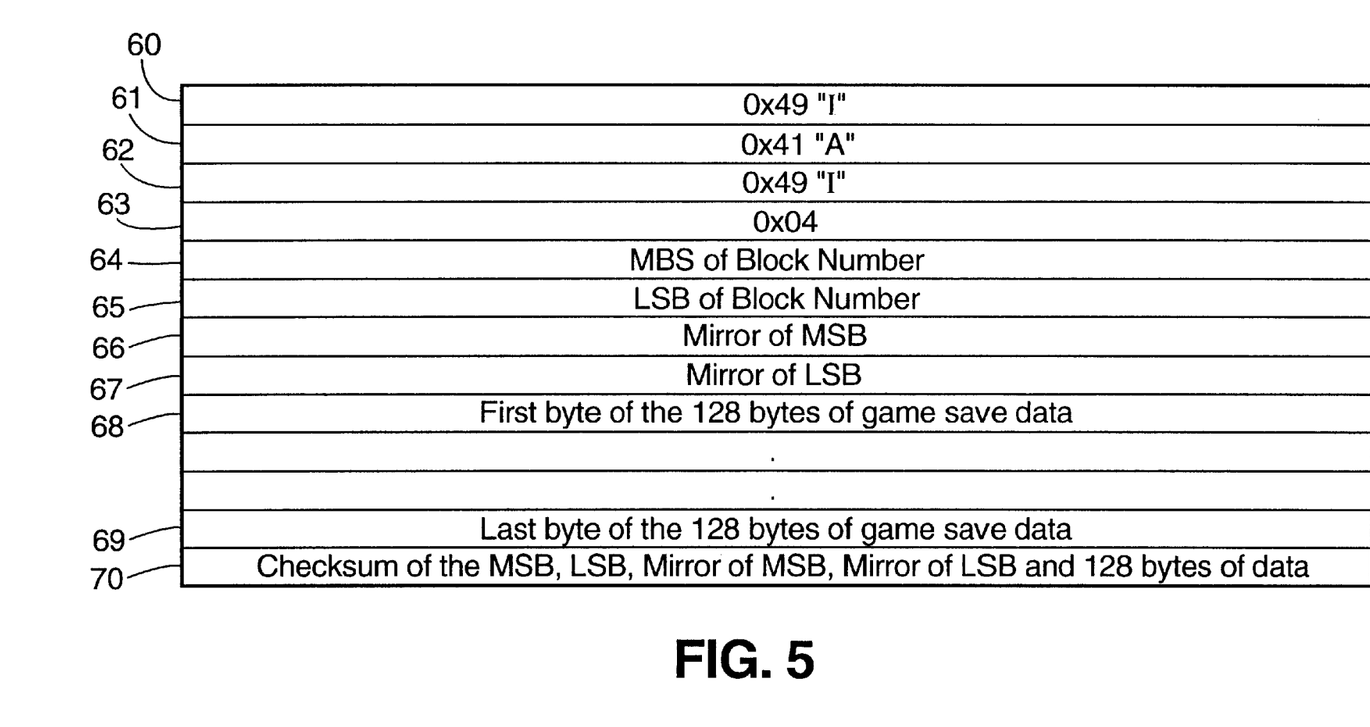
FIG. 5 is a block diagram of a data structure for requesting writing of game save information from a computer to a game save transfer device according to an embodiment of the invention.

As stated above, the computer may transmit a request write memory card command to the microcontroller 20. The request write memory card command may be utilized to determine whether the game system memory card is ready to receive game saves from the computer and to communicate to the microcontroller 20 the block number of the game save memory card to which game save data is to be written. The request write memory card command may also contain the actual game save data to be written to the game system memory card. FIG. 5 illustrates an exemplary data structure for the request write memory card command. Each row in the data structure illustrated in FIG. 5 represents a byte in the exemplary command. The first three rows 60, 61, and 62 may store a synchronization pattern for the request write memory card command. In the illustrated embodiment, the synchronization pattern is "IAI". The fourth row 63 in the request write memory command contains a command code for the microcontroller 20 to identify the request write memory card command. In the illustrated embodiment, the command code for the request write memory card command is 0x04. The fifth row 64 in the request write memory card command may contain the most significant byte of the block which is desired to be written to. The sixth row 65 may contain the least significant byte of the block which is desired to be written to. Accordingly, in order to write a game save to block number 3 in the game system memory card, the fifth row 64 may contain 0x00 and the sixth row 65 may contain 0x10.

The seventh and eighth rows 66 and 67 in the request write memory card command may respectively contain mirror images of the data in the fifth and sixth rows 64 and 65. For example, if the fifth and sixth rows 64 and 65 contain 0x00 and 0x10, the seventh and eighth rows 66 and 67 may respectively contain 0x00 and 0x01. Transmitting mirror images of the MSB and LSB of the block number may facilitate error detection and/or correction. For is example, the last row 70 may contain a checksum of the MSB, the LSB, mirror of MSB, mirror of LSB, and the game save data to detect errors.

The ninth row 68 in the request write memory card command may contain the actual data to be written to the game system memory. The second-to-last row 69 may contain the last byte of game save data to be written to the game system memory card. For example, in the illustrated embodiment, the request write memory card command stores one block containing 128 bytes of data to be written to a memory card configured to store data for the Sony "PlayStation". Accordingly, the ninth row 68 may store the first byte of the 128 bytes of game save data and the second-to-last, row 69 may contain the last byte of the 128 bytes of game save data. Rows between the ninth row 68 and the second-to-last row 69 may store game save data between the first and last bytes.

The computer preferably transfers the request write memory card to the microcontroller 20.

The present invention is not limited to the data structure in FIG. 5 to transmit game save information from the computer to the microcontroller 20. For example, the data structure may contain more than one block of memory to be written to game system memory cards configured to store game saves for the Sony "PlayStation". In an alternative embodiment, the data structure may be configured to store one or more pages of data to be written to memory cards configured to store game saves for the "Nintendo 64" game system. Transmitting any amount of data corresponding to a unit used to store game saves in any game system memory card is within the scope of the invention.

The microcontroller 20 may decode the request write memory card command and convert the block number into addresses in the game system memory card corresponding to the block number in a manner similar to that described above with respect to the read memory card command. The microcontroller 20 preferably also verifies that a game system memory card is connected to the memory card interface 4 and that the checksum is valid. If a game system memory card is connected to the memory card interface 4 and the checksum is correct, the microcontroller 20 preferably communicates this information to the computer and writes the game save data received in the request write memory card command to the game system memory card. The game save data may be written by transmitting address signals and applying the appropriate write signals to the RS-232 signal lines of the memory card interface 4, as discussed above.

According to another aspect, the invention may include a control program for controlling the transfer of game saves to and from the game system memory card in response to input from a user. The control program may be embodied in a computer readable medium, such as an optical disk, a magnetic disk, or any other memory device. The control program may be executed by a general purpose computer, such as the computer 10 illustrated in FIG. 1. In a preferred embodiment, the control program may comprise a windowed application compatible with one or more window-based operating systems, such as, "Windows 95", "Windows 98", and "Windows NT 4.0". Exemplary functions which may be performed by the control program include backing up all of the data on the game system memory card. Backing up all of the data on the game system memory card may include transferring all of the game saves stored on the game system memory card from the game system memory card, through the game save transfer device, and to the memory of the computer. Another function which may be provided by the control program is restoring data on a game system memory card. Restoring data on a game system memory card may include transferring game save data previously stored on the game system memory card from memory associated with the computer through the game save transfer device to the game system memory card. Another function which may be provided is duplicating a game system memory card. Duplicating a game system memory card may include connecting a first game system memory card to the game save transfer device, copying game save information from the first game system memory card to memory associated with the computer, disconnecting the first game system memory card from the game save transfer device, connecting a second game system memory card to the game save transfer device, and writing the game saves read from the first game system memory card to the second game system memory card. The backup, restore, and duplicate functions may be performed using the read and write hardware commands as discussed above. Additional functions which may be provided by the control program include formatting a game system memory card, deleting game saves from a game system memory card, and refreshing a game system memory card. In addition, the control program may call an e-mail program or a web browser to transfer game saves read from a game system memory card to and from other users via a network, such as the Internet.

Figure 6:
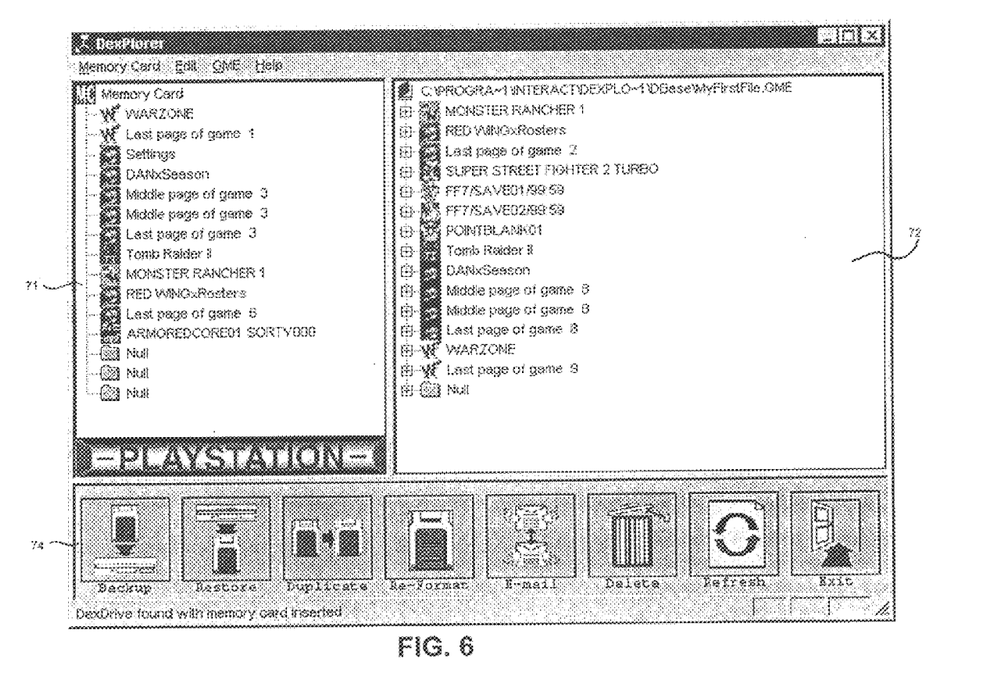
FIG. 6 is a computer image of a graphical user interface of a control program for transferring game saves to and from a game system memory card according to an embodiment of the invention.

According to an important aspect, the control program provides a graphical user interface (GUI) to allow a user to control transfer of game saves to and from the game system memory card and perform the functions described above. FIG. 6 illustrates an exemplary graphical user interface. The graphical user interface may be displayed on any electronic display device associated with a computer, e.g., a cathode ray tube display device or a liquid crystal display device. In FIG. 6, the graphical user interface comprises a window having left and right panels 71 and 72. The left panel 71 may be utilized to display the content of the game system memory card. In the illustrated embodiment, the left panel 71 displays folders corresponding to game saves stored on the game system memory card. The left panel in FIG. 6 indicates fifteen folders, which may correspond to blocks of game saves stored on a Sony "PlayStation" game system memory card. In the illustrated embodiment, names for game saves, such as, "WARZONE" are displayed. Empty folders are designated "Null". The right panel 72 in FIG. 6 may display game saves stored in memory associated with the computer. For the Sony "PlayStation" game saves, the computer may utilize a file extension of .GME for storing and displaying game save information. In the illustrated embodiment, some game saves, such as the game save for game 8 may span multiple pages or blocks. When storing game saves for other game systems, the computer may utilize alternate file extensions, e.g., .N64 for "Nintendo 64" game saves. A toolbar 74 may be located below the left and right panels and includes buttons corresponding to functions provided by the control program. In order to access any of the functions, the user may utilize any input device, such as a keyboard or a mouse. The interface may also include standard pull-down menu functions, e.g., cut, paste, delete, etc. to allow the user to transfer game saves from the computer to the memory card and from the memory card to the computer. The interface may also include drag and drop functions to allow game saves to be transferred from the game system memory card to the computer by dragging selected folders from the left panel and dropping the folders in the right panel. Game saves may be also transferred from the computer to the game system memory card by dragging folders from the right panel and dropping the folders in the left panel.

Figure 7:
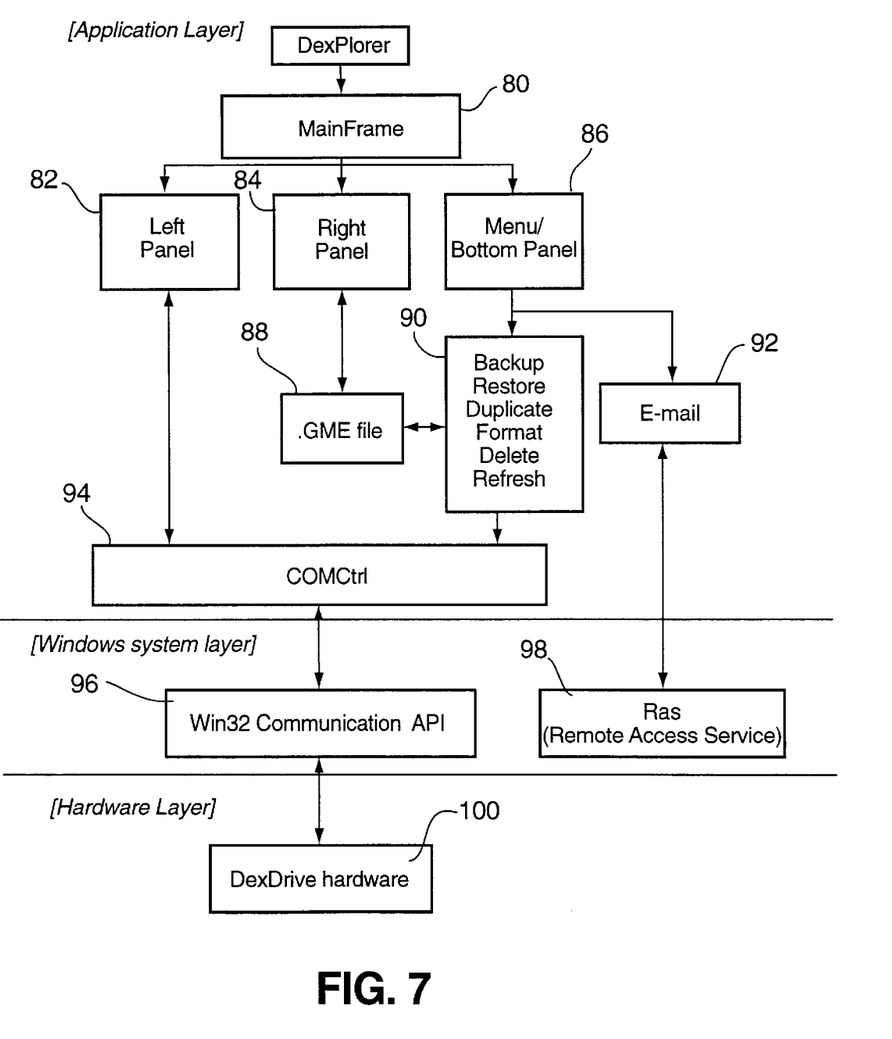
FIG. 7 is an architectural block diagram of a control program for transferring game saves to and from a game system memory card according to an embodiment of the invention.

FIG. 7 is an architectural block diagram illustrating an exemplary organization of the control program according to an embodiment of the invention. The classes may be structured according to the framework provided by the Microsoft Foundation Class (MFC) class library. Each class includes data structures and procedures, i.e., computer executable instructions, for performing the indicated function. In FIG. 7, block 80 indicates a mainframe display class for controlling display of the outer window of the graphical user interface illustrated in FIG. 6. Block 82 indicates a left panel class for controlling display of the left panel of the graphical user interface illustrated in FIG. 6. Block 84 indicates a right panel control class for controlling display of the right panel of the graphical user interface illustrated in FIG. 6. Block 86 indicates a menu control class for controlling display of the pull down menus and the toolbar at the bottom of the graphical user interface illustrated in FIG. 6. Block 88 indicates a class for creating and storing .GME files utilized to store Sony "PlayStation" game saves in memory associated with the computer. Block 90 indicates a class for controlling functions available through the toolbar 74. Block 92 indicates a class for controlling the e-mail function whereby the user may call up an existing e-mail program to send game saves over a network. For example, the e-mail class may specify a default e-mail program, such as "Microsoft Exchange" to transfer game saves over a network. Block 94 represents a communication control class that controls communications between the control program and the operating system. Block 96 represents the application program interface that the operating system provides to allow communication between the control program and external devices. In the illustrated embodiment, the application program interface is the Win32 Communication API. Block 98 indicates a remote access service, such as Winsock, whereby the e-mail program 92 may access remote machines over a network. Finally, block 100 represents the game save transfer device hardware, for example as illustrated in FIG. 2.

The present invention is not limited to the class structure illustrated in FIG. 7. For example, any class structure that allows the user to transfer game saves between a computer and a game system memory card is within the scope of the invention.

An example of how a user may utilize the control program and the game save transfer device to copy a game save from a game system memory card configured to store game saves for the Sony "PlayStation" game system follows. First, the user connects the game save transfer device to a computer. For example, the user may connect a first end of a cable to the computer serial port and a second end of the cable to the computer interface 4 of the game save transfer device 2. Next, the user connects the game system memory card to the memory card interface of the game save transfer device. Connecting the game system memory card may include inserting the memory card into a socket associated with the memory card interface game save transfer device. The user may then actuate the computer and the control program.

Figure 8:
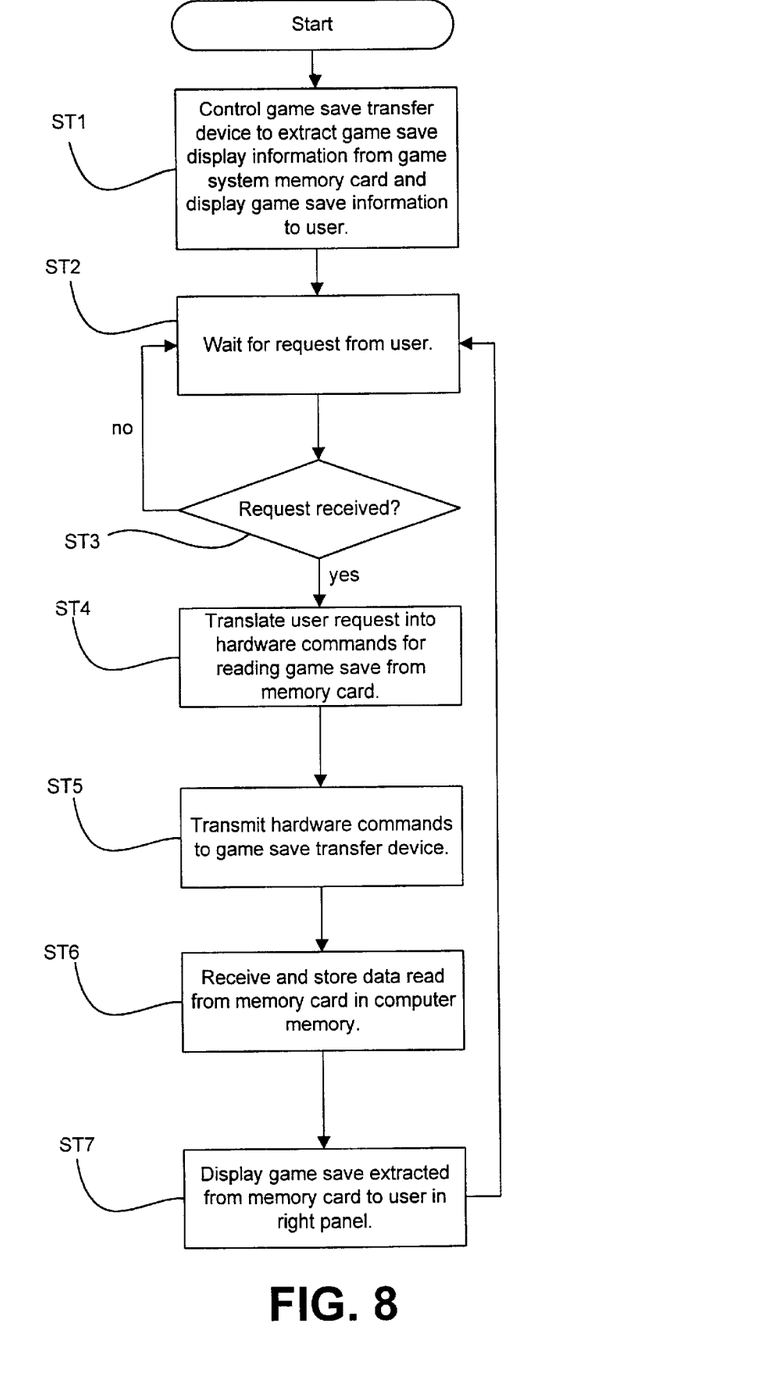
FIG. 8 is a flow chart illustrating steps which may be performed by the control program in response to a user request to copy a game save from a game system memory card to a computer.

FIG. 8 illustrates exemplary steps which the control program may perform in response to a user request to copy a game save from the game system memory card to the computer. First, the control program may control the game save transfer device to read game save display information stored on the game system memory card and display the game saves actually stored on the memory card to the user through the graphical user interface, for example, as illustrated in FIG. 6. (Step ST1) For example, each game save may include a header including data indicating the title of the game, graphical information for displaying an icon associated with the game to a user, and size information indicating the number of blocks that the game save spans. This header information may be transferred from the game system memory card, through the game save transfer device, to memory accessible by the control program to display the folder information in the left panel 71 for the game system memory card. The header information and graphical information may be extracted from the memory card using commands and data structures similar to those illustrated in FIGS. 3 and 4.

Once the control program displays the game saves stored on the memory card to the user, the control program may wait for requests, e.g., copy requests, from the user. (Step ST2) Next, the user may select one or more game saves to be copied to memory associated with the computer. In order to select the game saves to be copied, the user may use an input device, such as the mouse, to highlight one or more game save folders in the left panel 71 of the graphical user interface. The user may then utilize the copy function from the pull down menu to copy the selected game saves to the memory associated with the computer. Alternatively, the user may utilize the drag and drop function to select and move the game saves from the left panel 71 to the right panel 72. Using one of these mechanisms, the user generates a request for copying game save data from the game system memory card to the computer.

The control program may receive the request from the user and translate the user request into hardware commands for reading the selected game saves from the game system memory card. (Step ST4) For example, the control program may determine the block numbers corresponding to the game saves desired to be saved. The control program may then transmit a read memory card command, as illustrated in FIG. 3, for the corresponding block numbers to the microcontroller 20. (Step ST5) The microcontroller 20 may then convert the block numbers into memory addresses and read the appropriate block information from the game system memory card. The microcontroller 20 may then send the game save information to the computer, for example, using the data structure for sending data illustrated in FIG. 4. The control program may then receive and store the game save in memory, for example, on the hard disk. (Step ST6) The control program may then extract the necessary information to display the game save information to the user in the left panel of the graphical user interface and display the information to the user. (Step ST7) The control program may then return to wait for additional requests from the user.

Once the game save is stored in the computer memory, the user may simply leave the game save there for later use, or the user may desire to transmit the game save to another user over a network. In order to transfer the game save to another user, the user may access the e-mail button illustrated in the graphical user interface of FIG. 6. The e-mail button may call up a default e-mail program, such as "Microsoft Exchange". The user may then attach the game save to an e-mail file and transmit the game save to another user.

In an alternative embodiment, the user may call up a web browser, such as "Microsoft Internet Explorer" or "Netscape Communicator", and upload game saves to a web site. The user may also download game saves posted by another user on a web site. In yet another alternative, the user may utilize a file transfer protocol, such as FTP, to transfer game saves to another user through a network.

Although the flow chart in FIG. 8 illustrates steps for copying game saves from a game system memory card to a computer, the present invention is not limited to such an embodiment. For example, the control program may perform similar steps to copy game saves from the computer to the game system memory card. In such an embodiment, the control program may translate a user request into hardware commands for writing data to the game system memory card, such as the request write memory card command illustrated in FIG. 5. The steps of waiting for user requests and displaying game same information to the user may be similar to those illustrated in FIG. 8.

Although the embodiments described above include a game save transfer device and a control program for controlling the game save transfer device to transfer game saves to and from a personal computer, the present invention is not limited to such an embodiment. For example, in an alternative embodiment, the game save transfer device may be omitted. The game system memory card may connect directly to the serial port of the computer, for example, utilizing a cable or an adapter. The control program may convert user requests for reading or writing game saves into address signals to be transmitted to the game system memory card through the serial port. The address signals may be received serially by the interface circuitry in the game system memory card and converted to parallel signals to extract data from the memory card. The interface circuitry in the game system memory card may then transmit the requested data serially to the computer.

Because the present invention allows transfer of game saves from a game system memory card to and from a computer, available memory for storing game saves is virtually unlimited. Thus, a user with a single game system memory card can store game saves in computer memory even when the quantity of game save information greatly exceeds the capacity of a game system memory card. In addition, game saves can be transferred to other users utilizing networks, such as the Internet, without physically transferring the game system memory card to the other users.

While the invention has been described in some detail by way of illustration and example, it should be understood that the invention is susceptible to various modifications and alternative forms, and is not restricted to the specific embodiments set forth. These specific embodiments are not intended to limit the invention but, on the contrary, the intention is to cover all modifications, equivalents, and alternatives falling within the spirit and scope of the invention.

What is claimed is:

1. A graphical user interface displayable on an electronic display device for controlling transfer of game saves between a personal computer and a game system memory card comprising:

a first display area for displaying, as first icons, game save information corresponding to game saves stored in a game system memory card;

a second display area, separate from the first display area, for displaying, as second icons, game save information corresponding to game saves stored in a memory associated with a personal computer; and     means for copying game save information from the game system memory card to memory associated with the personal computer by moving a first icon from the first display area to the second display area and for transferring game saves from the memory associated with the personal computer to the game save memory card by moving a second icon from the second display area to the first display area.

* * * * *